United States Patent
Wiser et al.

(10) Patent No.: US 11,907,654 B2
(45) Date of Patent: Feb. 20, 2024

(54) CONTEXTUAL CREATION OF DISTRIBUTABLE ASSETS

(71) Applicant: Microsoft Technology Licensing, LLC, Redmond, WA (US)

(72) Inventors: Sean C. Wiser, San Francisco, CA (US); Vicki Liu, Long Island City, NY (US); Yi Li, Jersey City, NJ (US); Sameera Mahesh Padhye, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/867,664

(22) Filed: Jul. 18, 2022

(65) Prior Publication Data

US 2024/0020468 A1    Jan. 18, 2024

(51) Int. Cl.
*G06F 17/00*    (2019.01)
*G06F 40/197*    (2020.01)
*G06F 40/106*    (2020.01)

(52) U.S. Cl.
CPC .......... *G06F 40/197* (2020.01); *G06F 40/106* (2020.01)

(58) Field of Classification Search
CPC .... G06F 40/197; G06F 40/106; G06F 40/103; G06F 40/166
USPC ........................................................ 715/229
See application file for complete search history.

(56) References Cited

U.S. PATENT DOCUMENTS

| | | | |
|---|---|---|---|
| 9,282,287 B1* | 3/2016 | Marsh | H04N 7/152 |
| 2011/0231778 A1* | 9/2011 | Hoag | G06F 16/9535 |
| | | | 715/745 |
| 2013/0346885 A1* | 12/2013 | Singh | H04L 51/10 |
| | | | 715/758 |
| 2015/0287073 A1* | 10/2015 | Liu | G06Q 30/0246 |
| | | | 705/14.45 |
| 2016/0103927 A1* | 4/2016 | Garris | G06F 40/106 |
| | | | 715/238 |
| 2019/0253431 A1* | 8/2019 | Atanda | G06F 21/62 |
| 2022/0198056 A1* | 6/2022 | Nigro | H04M 1/72436 |

OTHER PUBLICATIONS

"Why use LinkedIn Marketing APIs?", Retrieved From: https://developer.linkedin.com/product-catalog/marketing, Retrieved On: Apr. 26, 2022, 4 Pages.
Jambe, et al., "Assets API", Retrieved From: https://docs.microsoft.com/en-us/linkedin/marketing/integrations/community-management/shares/vector-asset-api?tabs=http#/register-an-upload-for-video, Jun. 3, 2022, 17 Pages.

* cited by examiner

*Primary Examiner* — Jason T Edwards
(74) *Attorney, Agent, or Firm* — Nicholson De Vos Webster & Elliott LLP

(57) ABSTRACT

Embodiments of the disclosed technologies include receiving, from a first user device, a first user interface event that includes an upload of a media asset but does not indicate an intended usage for the media asset, determining an intended usage based on a second user interface event, mapping the intended usage to a usage-based specification, converting the media asset to a usage-specific version of the media asset by applying the usage-based specification to the media asset, and initiating a distribution of the usage-specific version of the media asset instead of the media asset to at least one second user device different from the first user device.

20 Claims, 9 Drawing Sheets

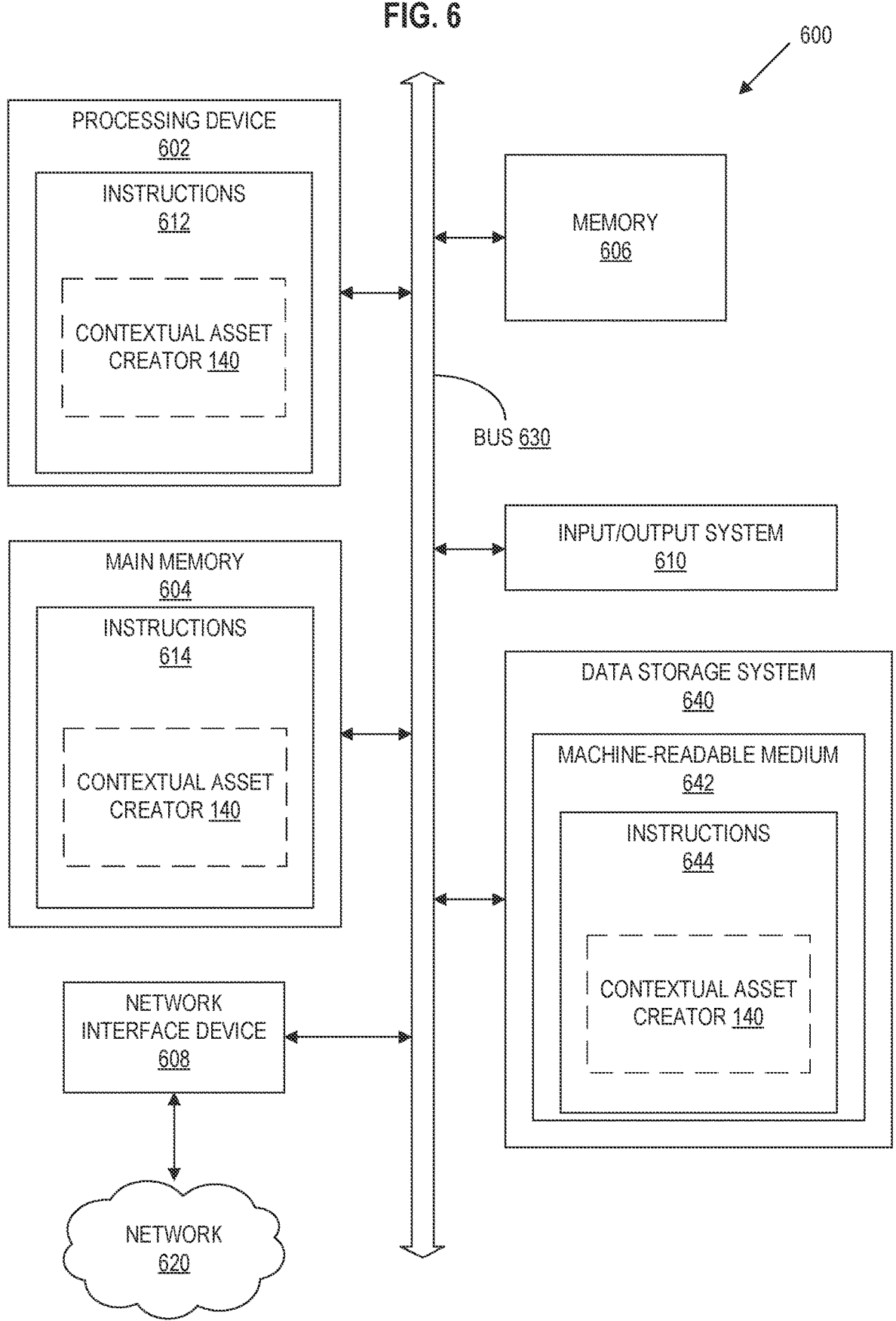

CONTEXTUAL CREATION OF DISTRIBUTABLE ASSETS

TECHNICAL FIELD

A technical field to which the present disclosure relates is digital content distribution. Another technical field to which the present disclosure relates is the automatic creation of distributable versions of digital content items.

BACKGROUND

Software applications use computer networks to distribute digital content to user computing devices. These applications may need to accommodate a wide variety of different distribution contexts, such as different hardware devices, content delivery channels and user interface portals. Also, a single application may have multiple different ways of distributing digital content items; for example, through feeds, automated recommendations, ad channels, notifications, and messaging systems.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 6 is a block diagram of an example computer system in which embodiments of the present disclosure can operate.

DETAILED DESCRIPTION

Figure 1:
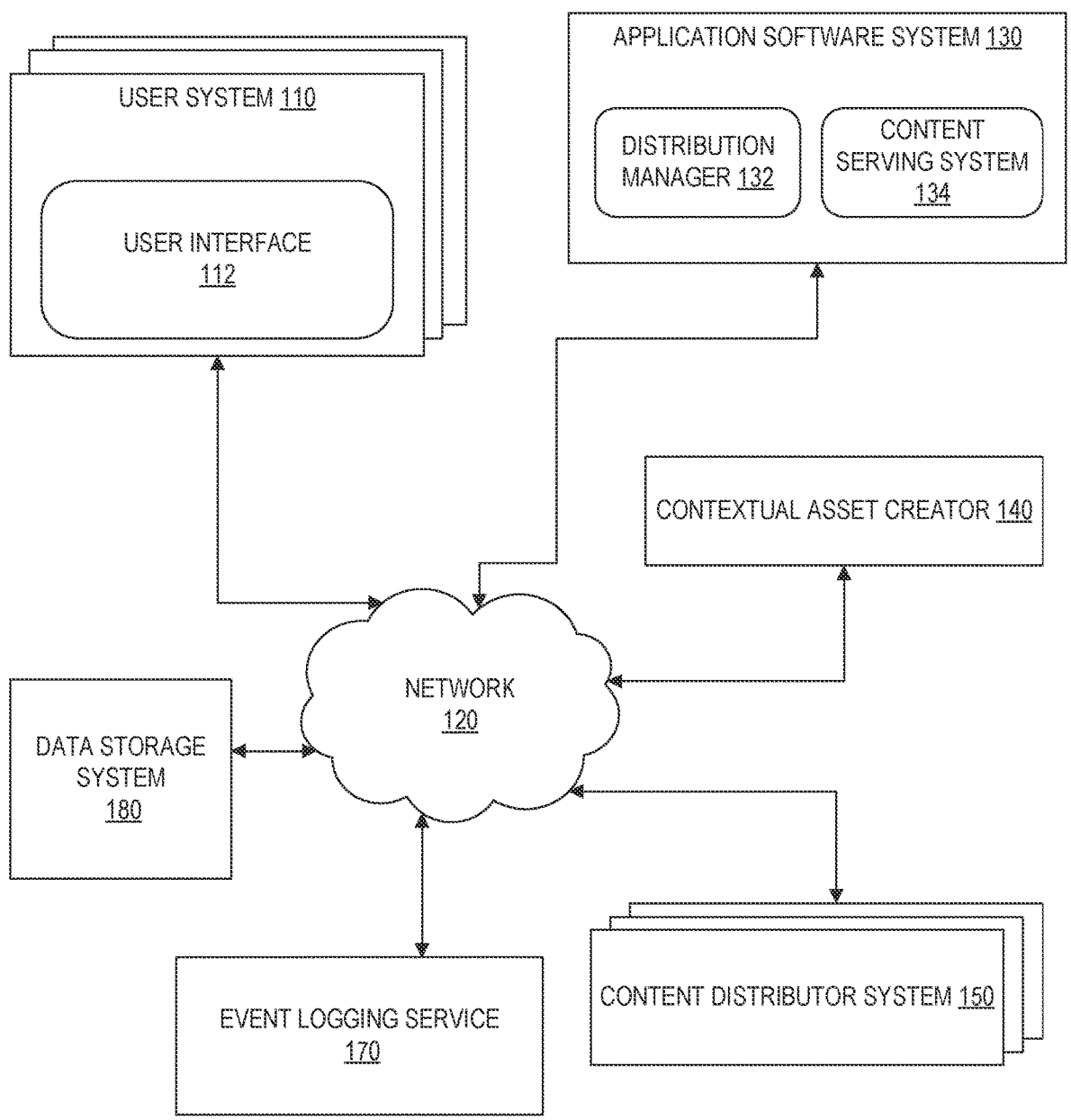
FIG. 1 illustrates an example computing system that includes a contextual asset creator component in accordance with some embodiments of the present disclosure.

Aspects of the present disclosure are directed to the creation of distributable media assets. Distributable as used here refers to a capability of a media asset to be automatically distributed to user devices electronically through one or more channels, portals, or other software and/or hardware-based content distribution mechanisms. Portal as used herein may refer to a software-based distribution mechanism, e.g., feeds, messaging systems, notification systems, etc. Channel as used herein may refer to a hardware-based distribution mechanism, such as a particular device or form factor; e.g., smart phone, laptop, tablet computer, or desktop computer to or through which content items are distributed. Distribution mechanism as used herein may refer to a software-based mechanism, a hardware-based mechanism, or a mechanism that is a combination of hardware and software; e.g., a device type and operating system combination or a device type and application software combination.

Media asset or asset as used herein refers to one or more digital content items that make up a single asset. For example, a video asset can include only a video, a video and a caption, or a video, a caption, and a thumbnail image. Similarly, a document asset can include one or more documents alone or in combination with a caption, a logo, or a watermark, and an image asset can include an image alone or in combination with a caption or an overlay, for instance.

Digital content item as used herein includes text, video, graphics, audio, digital imagery, or any combination of any of the foregoing, in a digital form. Organic content as used herein refers to digital content items that users do not pay to have distributed by an application software system. Organic content includes, for example, the free content that users share with each other on social media platforms. Sponsored content as used herein refers to digital content items that entities pay to have distributed among users of the application software system. Sponsored content includes, for example, digital advertising. Media assets can include organic content and/or sponsored content.

The creation of a distributable asset often involves the uploading of one or more files to be included in a content distribution. In traditional systems, the uploading of files for numerous different content distributions is non-trivial. For example, traditional approaches require a new copy of a file to be uploaded for each different distribution use case, even if the file already has been uploaded previously for a different use case. For instance, if the same content item is to be placed in a feed and also distributed via messaging, that content item would need to be uploaded twice, in traditional systems (one copy per use case). The need, in traditional systems, to upload the same file multiple times to accommodate multiple different use cases has created inefficiencies in both network bandwidth (due to unnecessary and duplicative uploads) and storage capacity (due to the need to store duplicate copies of the same file for different use cases) and has resulted in a sub-optimal user experience for content distributors. Thus, a technical challenge is to simplify and streamline the process of creating distributable media assets in order to improve bandwidth and storage requirements relative to prior approaches.

Aspects of the present disclosure address the above and other deficiencies by decoupling distribution use cases from file uploads and deferring the assignment of a use case to an asset until the asset is actually used. Removing the need to specify a use case at the file upload time as disclosed herein may be referred to as recipeless or usage-agnostic asset creation. Deferring the assignment of a use case to an asset until the asset is actually used in a distribution as disclosed herein may be referred to as just in time asset creation.

For example, in some embodiments, the file upload process is modified so that a user of a content distributor system does not need to include a recipe (also referred to herein as a specification) when calling the upload function. Embodiments add functionality that allows the recipe to be specified at a later time, after the uploaded media item is stored. When the uploaded item is needed for a task by the application software system, the type of task is detected and an appropriate recipe is selected automatically. The media item is then processed using the selected recipe. As a result, the media item only has to be uploaded once. Also, the media item is annotated with the selected recipe, such that only a single copy of the media item needs to be stored. Each time the content distributor system requests a new use case, a new annotation is added to the existing stored media item instead of creating and storing a new copy of the media item.

The disclosed just in time recipe processing produces usage-specific distributable media assets at the time the use case is determined. The disclosed approaches reduce the storage requirements and bandwidth needed between the software application and the application system since the media item is only uploaded and stored one time for all use cases.

Embodiments of the disclosed technologies are described in the context of online network-based digital content distribution systems. Any network-based application software system can act as a content distribution system. For example, news and entertainment apps installed on mobile devices, messaging systems, and social graph-based applications can all function as content distribution systems. An example of a content distribution use case is audience targeting for the distribution of advertisements for products and/or services over a social network. Another example of a content distribution use case is determining a rank order of content items to be placed in a user's feed.

Aspects of the disclosed technologies are not limited to ads targeting or to social network applications, but can be used to improve digital content distribution systems more generally. For example, the disclosed technologies are not limited to use in connection with social graph applications. The disclosed technologies can be employed by many different types of network-based applications in which content distribution is provided, including but not limited to various types and forms of application software systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system that includes a contextual asset creator component in accordance with some embodiments of the present disclosure.

In the embodiment of FIG. 1, computing system 100 includes a user system 110, a network 120, an application software system 130, a contextual asset creator 140, a content distributor system 150, an event logging service 170, and a data storage system 180.

In some embodiments, application software system 130 includes a distribution manager 132. In those embodiments, distribution manager 132 interfaces with contextual asset creator 140 to manage the creation of distributable media assets. For example, distribution manager 132 manages file uploads from user systems 110 to contextual asset creator 140.

In some embodiments, application software system 130 includes a content serving system 134, which executes distributions of media assets created by contextual asset creator 140. For example, after a digital content item is converted into a distributable asset by contextual asset creator 140, content serving system 134 may include the distributable asset in a ranking of media assets and assign the distributable asset to a corresponding slot of a distribution portal, such as a feed or an ad slot of a particular user system, in accordance with its ranking.

User system 110 includes at least one computing device, such as a personal computing device, a server, a mobile computing device, or a smart appliance. User system 110 includes at least one software application, including a user interface 112, installed on or accessible by a network to a computing device. In some embodiments, user interface 112 is or includes a front-end portion of application software system 130 and/or a front-end portion of content distributor system 150. For example, embodiments of user interface 112 include a graphical display screen that includes one or more content distribution portals or channels, such as a feed, an ad portal, or a messaging interface.

User interface 112 is any type of user interface as described above. User interface 112 can be used to input data or search queries and view or otherwise perceive output that includes distributable media assets produced by application software system 130 or content distributor system 150. For example, user interface 112 can include a graphical user interface and/or a conversational voice/speech interface that includes mechanisms for scrolling and interacting with a news feed, entering a search query, and viewing messages, recommendations, ads, query results and/or other digital content. Examples of user interface 112 include web browsers, command line interfaces, and mobile apps. User interface 112 as used herein can include application programming interfaces (APIs).

Application software system 130 is any type of application software system that provides or enables at least one form of digital content distribution to user systems such as user system 110. Examples of application software system 130 include but are not limited to connections network software, such as social media platforms, and systems that are or are not based on connections network software, such as general-purpose search engines, job search software, recruiter search software, sales assistance software, content distribution software, learning and education software, or any combination of any of the foregoing.

Contextual asset creator 140 creates recipeless, just in time distributable versions of media assets as described herein. In some embodiments, contextual asset creator 140 is implemented as an application program interface (API) library. In other embodiments, contextual asset creator 140 is a separate component of application software system 130 or a separate component of computing system 100. For instance, contextual asset creator 140 can be implemented as a network service that is called or accessed by application software system 130, for example by distribution manager 132 or content serving system 134.

Content distributor system 150 is any type of application software system that provides digital content items for distribution to user systems through application software system 130. Examples of content distributor system 150 include but are not limited to any type of networked software application that generates or distributes sponsored content and/or organic content.

Event logging service 170 captures user interface events such as file uploads, page loads and clicks, in real time, and formulates the user interface events into a data stream that can be consumed by, for example, a stream processing system. For example, when a user of application software system 130 or content distributor system 150 uploads a file through, e.g., distribution manager 132, clicks on a user interface control such as view, comment, share, like, or loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.). Event logging service 170 generates a data stream that includes one record of real-time event data for each user interface event that has occurred.

Time as used in the context of terminology such as just in time or real time refers to a time delay introduced by the use of computer technology, e.g., by automated data processing and/or network transmission, where the time delay is the difference in time, as measured by a system clock, between the occurrence of an online event and the use of data processed in response to the event, such as for display, feedback, and/or control purposes.

Data storage system 180 includes data stores and/or data services that store digital content items, data received, used, manipulated, and produced by application software system 130 and/or content distributor system 150. Alternatively or in addition, data storage system 180 includes data stores and/or data services that store data received, used, manipulated, and produced by contextual asset creator 140. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time, near real-time (also referred to as nearline), and/or offline (e.g., batch) data processing. A data store configured for real-time data processing can be referred to as a real-time data store. A data store configured for near real-time data processing can be referred to as a near real-time data store or nearline data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, network 120, application software system 130, contextual asset creator 140, content distributor system 150, event logging service 170, and data storage system 180 includes an interface embodied as computer programming code stored in computer memory that when executed causes a computing device to enable bidirectional communication with any other of user system 110, network 120, application software system 130, contextual asset creator 140, content distributor system 150, event logging service 170, and data storage system 180 using a communicative coupling mechanism. Examples of communicative coupling mechanisms include network interfaces, inter-process communication (IPC) interfaces and application program interfaces (APIs).

A client portion of application software system 130 and/or content distributor system 150 can operate in user system 110, for example as a plugin or widget in a graphical user interface of a software application or as a web browser executing user interface 112. In an embodiment, a web browser transmits an HTTP request over a network (e.g., the Internet) in response to user input that is received through a user interface provided by the web application and displayed through the web browser. A server running application software system 130 and/or a server portion of application software system 130 can receive the input, perform at least one operation using the input, and return output using an HTTP response that the web browser receives and processes.

Each of user system 110, application software system 130, contextual asset creator 140, content distributor system 150, event logging service 170, and data storage system 180 is implemented using at least one computing device that is communicatively coupled to electronic communications network 120. Any of user system 110, application software system 130, contextual asset creator 140, content distributor system 150, event logging service 170, and data storage system 180 can be bidirectionally communicatively coupled by network 120. User system 110 as well as one or more different user systems (not shown) can be bidirectionally communicatively coupled to application software system 130 and/or content distributor system 150.

A typical user of user system 110 can be an administrator or end user of application software system 130, contextual asset creator 140, and/or content distributor system 150. User system 110 is configured to communicate bidirectionally with application software system 130, contextual asset creator 140, and/or content distributor system 150 over network 120.

The features and functionality of user system 110, application software system 130, contextual asset creator 140, content distributor system 150, event logging service 170, and data storage system 180 are implemented using computer software, hardware, or software and hardware, and can include combinations of automated functionality, data structures, and digital data, which are represented schematically in the figures. User system 110, application software system 130, contextual asset creator 140, content distributor system 150, event logging service 170, and data storage system 180 are shown as separate elements in FIG. 1 for ease of discussion but the illustration is not meant to imply that separation of these elements is required. The illustrated systems, services, and data stores (or their functionality) can be divided over any number of physical systems, including a single physical computer system, and can communicate with each other in any appropriate manner.

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Further details with regard to the operations of the contextual asset creator 140 are described below.

Figure 2:
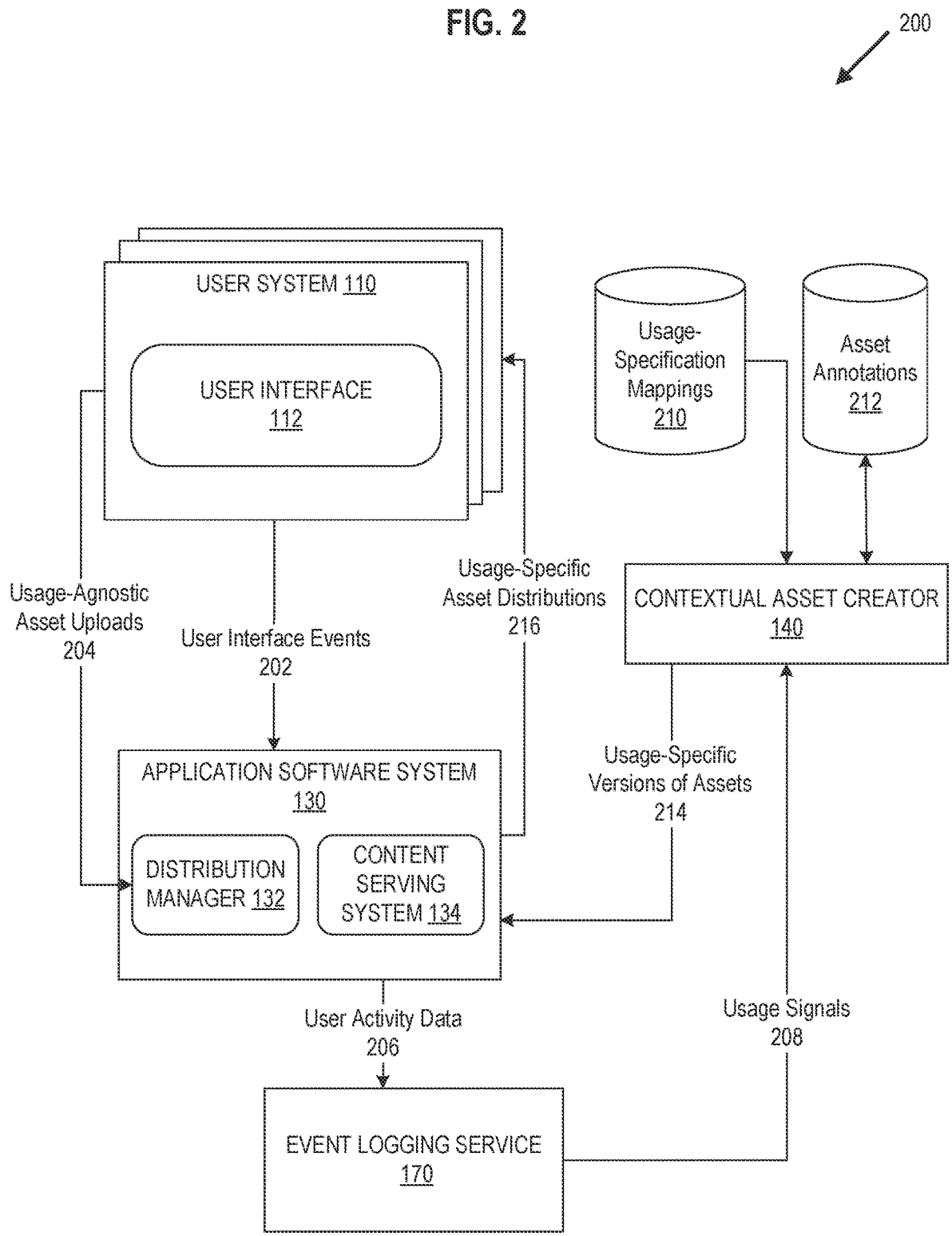
FIG. 2 is a flow diagram of an example method for creating distributable versions of content items in accordance with some embodiments of the present disclosure.

FIG. 2 is a flow diagram of an example method for creating distributable versions of content items in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the application software system 130 of FIG. 1 in cooperation with contextual asset creator 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

As shown in FIG. 2, in operation, application software system 130 receives user interface events 202 and usage-agnostic asset uploads 204 from one or more user systems 110. Examples of user interface events 202 include the input of a search term, the liking or sharing of a post, the input of a comment on a post, and the scrolling of a user interface screen such as a feed. User interface events 202 can also or alternatively include the absence of explicit action; for example, time delays between explicit actions in the user interface.

Usage-agnostic asset uploads 204 are a particular type of user interface event that involve the upload, transfer or copying of a digital file from a user system 110 to application software system 130, where the upload, transfer or copying event does not specify any particular usage for the uploaded file and the uploaded file contains one or more media assets. For example, in some embodiments, a usage-agnostic asset upload includes a digital image, a digital video, or a document, but does not indicate any particular distribution mechanism to apply to the digital image, video, or document. Usage-agnostic asset uploads 204 are implemented, for example, by an application program interface (API) call that does not include or does not require a usage to be specified as a parameter or argument of the call. In this way, the intended usage of the asset does not need to be known or determined at the time of upload but can be determined at a later time. Also, multiple different intended usages can be attached to a single copy of the uploaded asset by, for example, storing usage annotations in a searchable database.

Usage-agnostic uploads 204 are received by distribution manager 132 of application software system 130 and the uploaded files are stored in memory, initially without any usage annotations. In some embodiments, distribution manager 132 applies a usage-agnostic or generic specification (not shown) to the uploaded asset. The usage-agnostic specification (or recipe) includes, for example, instructions for creating a distributable version of the asset that are not specific to any particular intended usage. An example of a usage-agnostic specification is instructions that are applicable to all assets of a particular asset type regardless of the intended usage of the asset, such as instructions to append certain metadata to uploaded assets of that type. For instance, an instruction to append resolution data and/or aspect ratio data could be included in a usage-agnostic specification for digital images but not in a usage-agnostic specification for documents. Usage-agnostic specifications and mappings of usage-agnostic specifications to asset types are maintained in computer memory by distribution manager 114 using, for example, a searchable data structure of application software system 130 or data storage system 180.

Distribution manager 114 receives usage-agnostic uploads 204 and stores the uploaded files in computer memory using, for example, a searchable data structure of application software system 130 or data storage system 180. Distribution manager 114 determines the asset type associated with the uploaded files. For example, distribution manager 114 parses the file name of the uploaded file and determines the asset type by mapping the file extension to an asset type. For instance, distribution manager 114 could map a file extension of ".pdf" to an asset type of document or map a file extension of ".jpg" to an asset type of image.

Based on the asset type, distribution manager 114 determines whether the asset type maps to any pre-specified usage-agnostic specifications. If the asset type maps to an existing usage-agnostic specification, distribution manager 114 applies the applicable usage-agnostic specification to the uploaded asset to create an intermediate version of the asset that is usage-agnostic, where the intermediate version of the asset is different from the usage-based distributable version of the asset created at the time the usage is determined. Alternatively, distribution manager 114 updates the asset metadata to include an identifier of the applicable usage-agnostic specification or a link to the applicable usage-agnostic specification, so that the usage-agnostic specification can be applied to the asset at a later time. To apply the usage-agnostic specification to the asset, a calling program such as a media file uploader makes an API call to create a usage-agnostic asset of a specific media type, such as an "image API" or "video API," from the uploaded file.

After a usage-agnostic asset upload 204, application software system 130 or distribution manager 114 receives one or more user interface events 202 that individually or collectively indicate an intended usage of the uploaded asset. For example, distribution manager 114 receives an API call that identifies or references a previously uploaded asset, e.g., by referencing a unique identifier of the asset, or application software system 130 receives, for instance, a click on a 'post,' 'share,' or 'add to feed,' or similar button or other user interface control. These and/or other user interface events are logged as user activity data 206 by, for example, event logging service 170.

Contextual asset creator 140 monitors user activity data 206 for indications of intended usage of uploaded assets and receives one or more usage signals 208 from time to time. Usage signals 208 indicate intended usages for uploaded assets. Examples of usage signals 208 include hardware and/or software contextual identifiers. Examples of hardware usage signals include device identifiers and/or device type identifiers that are passed to application software system 130 from user systems 110 or obtained, for instance, by querying a user's profile data. Examples of software usage signals include application portal identifiers and operating system identifiers. For instance, a usage signal 208 could indicate that a particular asset is to be distributed only to mobile devices, or only to web browsers. Alternatively or in addition, a usage signal could indicate that a particular asset is to be distributed through a messaging application or by inclusion in a feed.

Contextual asset creator 140 maps intended usages indicated by or included in usage signals 208 to usage-based specifications by querying usage-specification mappings 210. Usage-specific mappings 210 define available asset usages and associated usage-based specifications. Usage-specific mappings 210 are implemented as a lookup table, a rules engine, or a searchable data structure, for example.

After contextual asset creator 140 has mapped the intended usage to a usage-based specification for a particular asset, contextual asset creator 140 creates and stores an asset annotation 212 in a searchable database or another type of retrievable format, where the asset annotation 212 identifies or enables access to the applicable usage-based specification. For example, contextual asset creator 140 appends an identifier for a usage-based specification (or recipe) to a previously stored asset.

Contextual asset creator 140 applies the usage-based specification to the asset to create a distributable version of the asset for the intended usage. To create the usage-specific version of the asset 214, contextual asset creator 140 performs one or more operations or transformations on the asset just prior to a distribution. Examples of usage-specific operations or transformations that can be performed on an asset by contextual asset creator 140 include changing the asset's output format to accommodate one or more physical characteristics of particular hardware and/or software requirements of user systems to which the asset is distributed. For example, contextual asset creator 140 can change the asset ratio of a digital image and/or resize the image for a feed distribution to mobile devices and then change the asset ratio or image size again to different values for a different distribution through a messaging application through a browser on a desktop or laptop device.

In this way, an asset can be uploaded by a content distributor without specifying any particular usage. The usage-agnostic version of the asset is not converted into a usage-specific version of the asset until a usage signal indicating a particular usage is received. For example, a usage-agnostic specification is initially applied to an image asset at the time of initial upload. After each subsequent usage of the asset, for example different use cases 1, 2, 3, the asset annotations 212 for the asset are updated to include the corresponding usage-based specification such that after all three use cases, the full annotation for the asset would include [usage-agnostic, 1, 2, 3]. The complete set of outputs for all of the use cases that have been assigned to the asset is the full union of all artifacts specified by all of the specifications identified in the annotation (four, in this example). In other words, there are no duplicate artifacts and all unique artifacts are included in the annotation.

Contextual asset creator 140 provides usage-specific versions of assets 214 to application software 130 for distribution. Content serving system 134 executes one or more usage-specific asset distributions 216 to one or more user systems 110, which include the usage-specific versions of assets 214, in accordance with the intended usages.

The flow of FIG. 2 from the time a usage signal 208 is detected to the generation by contextual asset creator 140 of a usage-specific version of an asset 214 occurs in real time, in some embodiments. For example, after a content distributor user system indicates or requests an intended usage by issuing a user interface event that references the intended usage and a previously uploaded asset, the usage-specific version of the previously uploaded asset is created for the intended usage in real time in response to that user interface event.

Figure 3A:
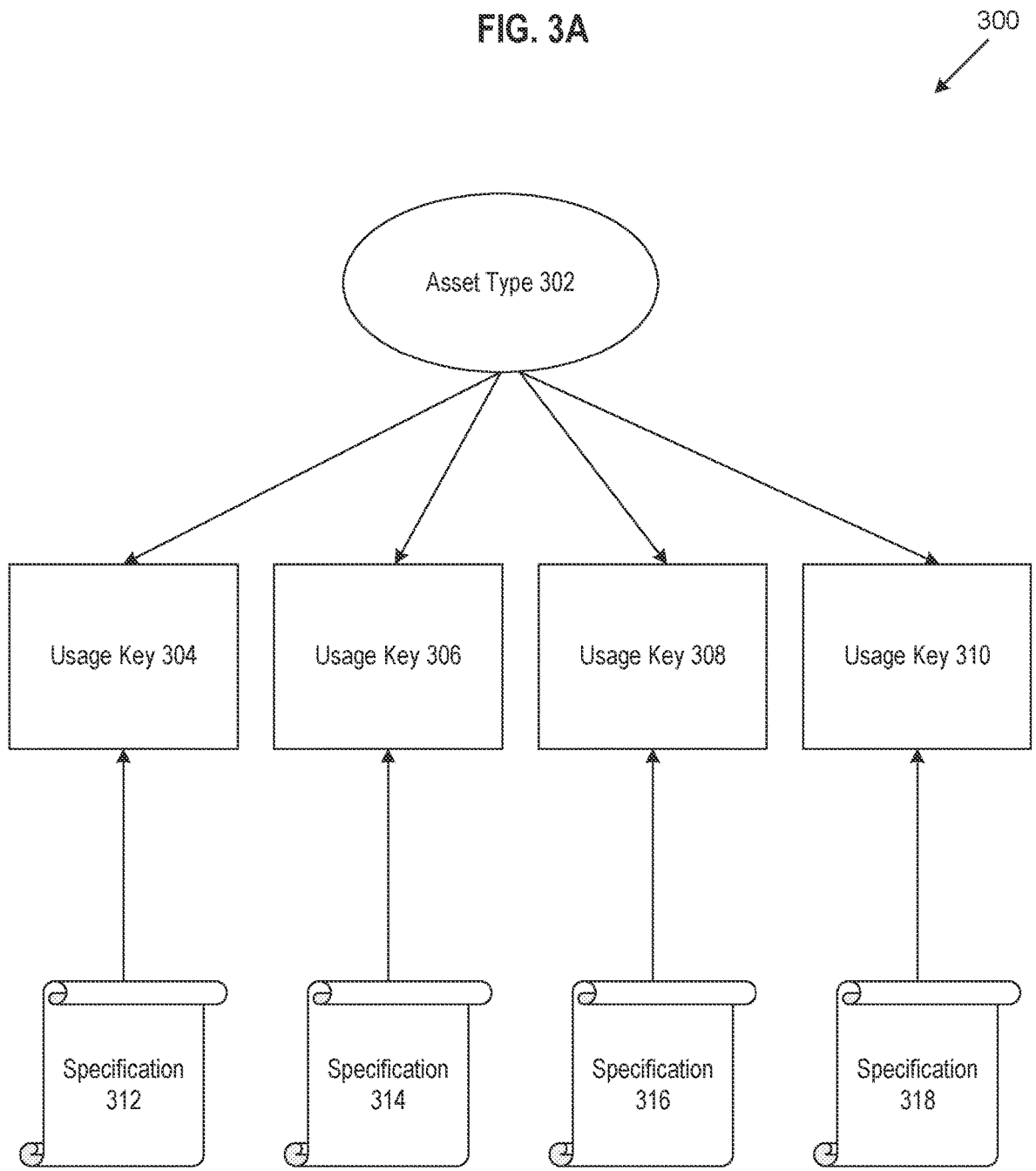
FIG. 3A is a flow diagram of an example method for mapping distribution mechanisms to distribution specifications, in accordance with some embodiments of the present disclosure.

FIG. 3A is a flow diagram of an example method for mapping intended usages of assets to distribution specifications, in accordance with some embodiments of the present disclosure. Portions of the method 300 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the contextual asset creator 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3A depicts a mapping of intended usages to usage-based specifications, which is used to implement usage-specification mappings 210, in some embodiments. In the embodiment of FIG. 3A, an asset type 302 maps to multiple different usage keys 304, 306, 308, 310 and each usage key maps to a single corresponding specification 312, 314, 316, 318. Usage keys 304, 306, 308, 310 are configured to facilitate the mapping of intended usages to usage-based specifications.

Examples of asset types include document, image, and video and combinations of any of the foregoing. An example of a usage key is an identifier, such as a text label that uniquely identifies a particular intended usage apart from other intended usages. A particular usage-based specification 312, 314, 316, 318 contains at least one instruction that is specific to its corresponding intended usage and which is not included in other usage-based specifications. For example, different usage-based specifications can specify different processing operations, output formats, different artifact classes, and/or different artifacts for different usages. Artifacts and artifact classes are described in more detail below with reference to FIG. 3C. A usage-based specification 312, 314, 316, 318 can include one or more instructions that are also included in one or more other usage-based specifications. For example, different usage-based specifications can contain one or more of the same usage-agnostic specifications.

The mapping of FIG. 3A shows a one-to-many relationship between asset type and usage key and a one-to-one relationship between usage key and usage-based specification. In other embodiments, there can be a many-to-many relationship between asset type and usage key. For example, two different asset types could map to the same usage key for a particular usage and also map to different usage keys for other usages. Also in other embodiments, there can be a one-to-many or many-to-many relationship between usage key and specification. For example, different usage keys could map to the same specification or a particular usage key could map to more than one specification. The particular configuration of usage to specification mapping is determined by the requirements of a particular design or implementation.

Figure 3B:
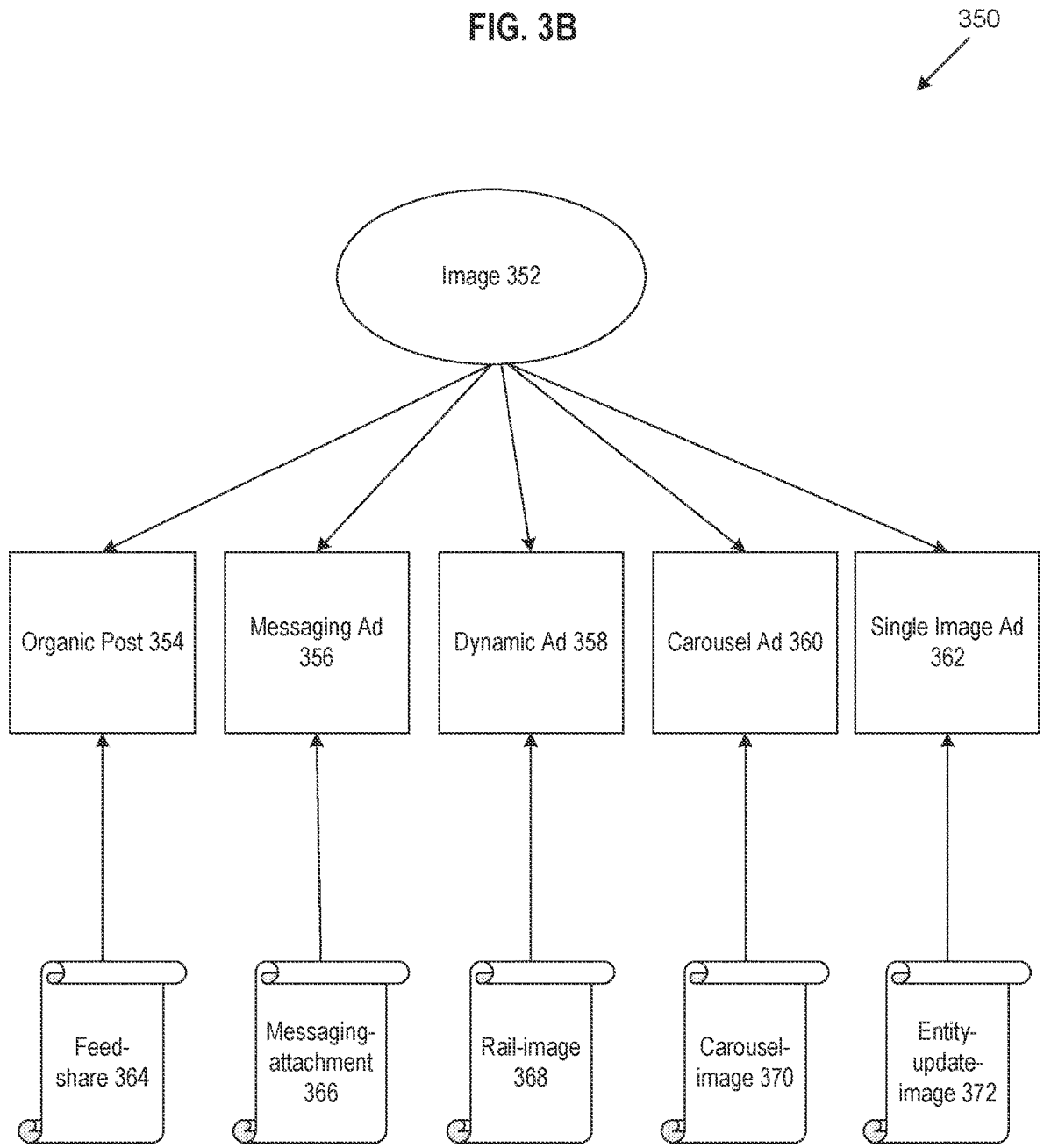
FIG. 3B is a flow diagram of another example method for mapping distribution mechanisms to distribution specifications, in accordance with some embodiments of the present disclosure.

FIG. 3B is a flow diagram of an example method for mapping distribution mechanisms to distribution specifications, in accordance with some embodiments of the present disclosure.

Portions of the method 350 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 350 is performed by the contextual asset creator 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

FIG. 3B is similar to FIG. 3A and depicts an example mapping of intended usages to usage-based specifications for an asset type of image 352. In the embodiment of FIG. 3B, the image asset type 352 maps to multiple different usage keys that each represent a different distribution mechanism: organic post 354, messaging ad 356, dynamic ad 358, carousel ad 360, single image ad 362. Each usage key maps to a single corresponding usage-based specification 364, 366, 368, 370, 372. Usage keys 354, 356, 358, 360, 362 correspond to usages or distribution mechanisms that are applicable to the image asset type. For example, a distribution mechanism that is not applicable to the image asset type would not have a usage key in the mapping of FIG. 3B. Also, a usage key in the mapping of FIG. 3B that is not applicable to another asset type would not be included in the mapping for that other asset type. For instance, the distribution mechanism single image ad 362 would not be included in a mapping for a document asset type.

In the example of FIG. 3B, the usage keys that are applicable to the image asset type are organic post 354, messaging ad 356, dynamic ad 358, carousel ad 360, and single image ad 362. The usage keys represent mechanisms for content distribution of digital images that are available in a particular implementation of the application software system 130. Other implementations can have different usage keys and mappings. As such, the usage keys included in the mapping are application-dependent. For example, an application that does not include dynamic ad functionality would not include the dynamic ad key 358.

The particular usage-based specifications 312, 314, 316, 318 for the associated image asset type 352 each contain at least one instruction that is specific to the corresponding intended usage and which is not included in other usage-based specifications. For example, the feed-share specification 364 can specify a different image size and/or a different aspect ratio than the messaging-attachment specification 366 or the carousel-image specification 370, and so on.

Other image processing instructions that can be stored in one or more of the usage-based specifications 312, 314, 316, 318 include blur processing instructions, object or face recognition instructions, up sampling or down sampling instructions, color histogram processing instructions, encryption or decryption instructions, video encoding or decoding instructions, etc.

Other examples of usage-based specifications include instructions to prompt the calling program to supply a caption to a digital image or to add a thumbnail image to a video for a messaging ad. Still other examples of usage-based specifications include instructions for converting an asset from a first format to a second format different from the first format for a particular distribution mechanism or to execute a validation process on a usage-specific version of an image or other asset. An example of a validation process is an error checking process that checks to make sure that all portions of an image or all segments of a video or all pages of a document have been pre-processed without any errors.

Figure 3C:
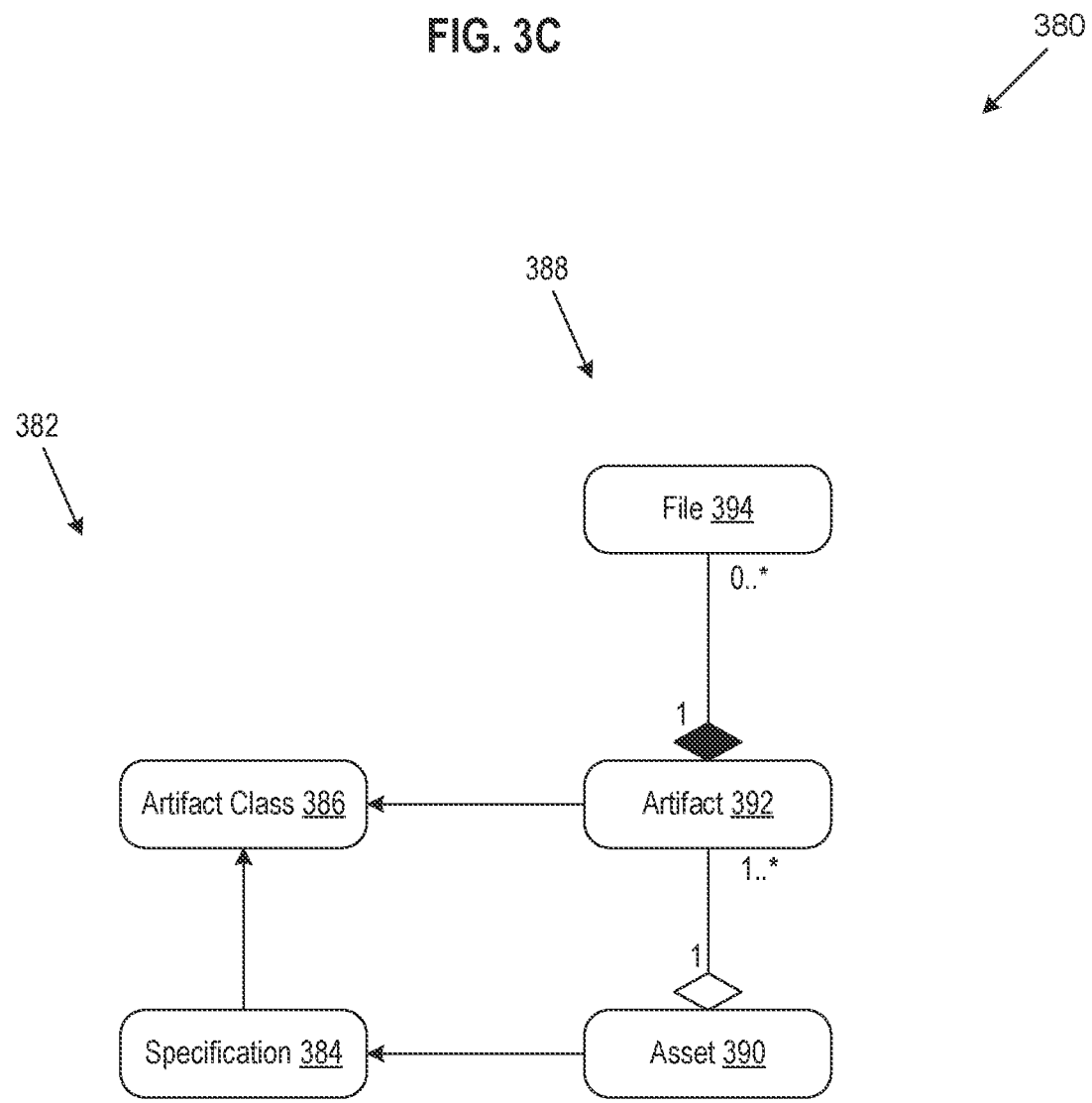
FIG. 3C is a flow diagram of an example of a data structure for a specification in accordance with some embodiments of the present disclosure.

FIG. 3C is a flow diagram of an example of a specification for an asset, in accordance with some embodiments of the present disclosure.

Portions of the flow 380 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 380 is performed by the contextual asset creator 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The flow of FIG. 3C depicts an example of entity relationships between an asset 390, a specification 384, an artifact 392, an artifact class 386, and a file 394. Components of a usage-based specification are in column 382 while components of a data blob, including a file 394 produced by the application of specification 384 to asset 390, and one or more artifacts 392 produced by the application of the specification 384 to the asset 390 are shown in column 388. The diamond-shaped elements indicate whether the relationship between entities is required or optional. For example, the filled-in diamond indicates that an artifact 392 is required to have an associated file 394, while the diamond that is not filled in indicates that an asset 390 is not required to have an artifact 392.

Artifact as used herein includes a media artifact and/or a data artifact. A media artifact is a representation of media content of an asset in a particular output format. A data artifact is data about the media content of an asset. Artifacts can have one or more associated files, depending on the applicable representation of the output format. An asset can have one or more associated media artifacts and/or data artifacts. A file may or may not have a particular artifact.

Artifact class as used herein refers to a set of instructions for generating an artifact. An artifact class can contain additional information such as dependencies on other artifact classes, where the dependencies need to be enforced for the artifact to be generated properly. Both media artifacts and data artifacts have artifact classes. There is a one-to-one relationship between artifacts and artifact classes, in some embodiments.

A given usage-based specification 384 defines all of the required and optional artifact classes to be applied to an uploaded media file to generate artifacts 392. After a usage-based specification is executed and all of the required artifacts have been created, the status of the usage-based specification for the asset is marked to indicate that a distributable version of the media asset is available for distribution.

Figure 4:
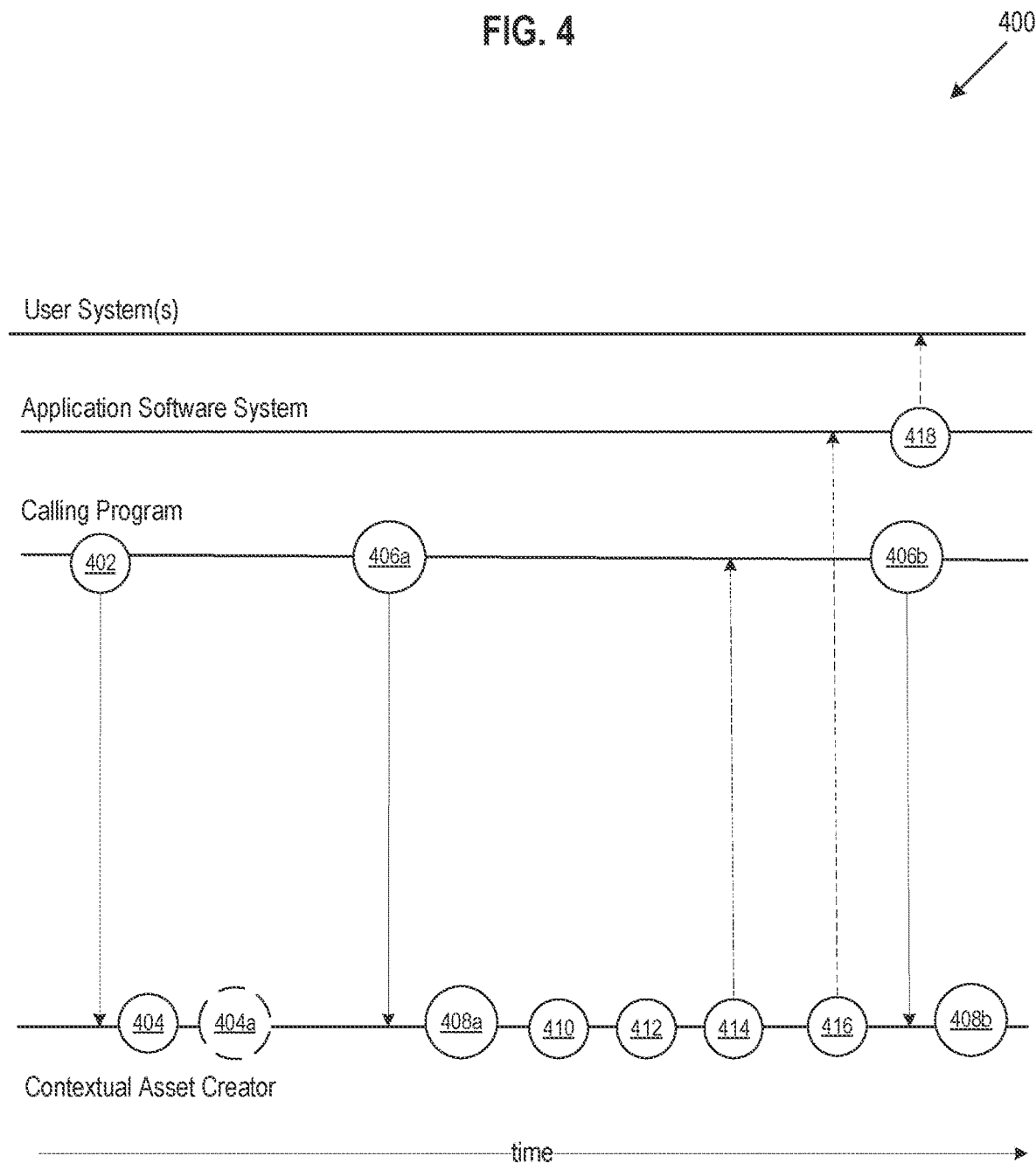
FIG. 4 is a timing diagram of an example method for creating distributable versions of media assets in accordance with some embodiments of the present disclosure.

FIG. 4 is a timing diagram of an example method for creating usage-specific distributable versions of media assets in accordance with some embodiments of the present disclosure. The relative sizing of elements and spacing between elements in FIG. 4 does not necessarily correlate with amounts of elapsed time.

Portions of the method 400 are performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the contextual asset creator 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

In FIG. 4, at time 402, a calling program, such as distribution manager 132, sends an uploaded asset file to a contextual asset creator program or service, such as contextual asset creator 140. At time 404, the contextual asset creator receives the uploaded file and determines the asset type of an asset contained in the uploaded file. At time 404a, the contextual asset creator determines a usage-agnostic specification based on the asset type and applies the usage-agnostic specification to the uploaded asset. Time 404a is shown in dashed lines to indicate that this step is omitted in some embodiments.

At time 406a, the calling program sends a usage signal to the contextual asset creator. For example, the usage signal contains a reference to the asset that was uploaded at time 402 and the usage signal also indicates an intended usage for the asset. While not specifically shown, it should be understood that the usage signal is derived from one or more user interface events emitted by a user system and received by the application software system, or from user interface events emitted by the user system and received at the calling program. As such, the intended usage included in the usage signal is implicit from the user activity rather than explicitly stated for example in an API call. The intended usage is determined by mapping data extracted from the user activity to an intended usage using, for example, a mapping table, a rules engine, or a machine learning model that has been trained to predict intended usages based on user interface events.

At time 408a, the contextual asset creator maps the intended usage to a usage key. The usage key is used as an index to the usage-based specifications. At time 410, the usage key is mapped to a corresponding usage-based specification. At time 412, the uploaded asset is annotated with the usage-based specification determined at time 410. At time 414, the usage-based specification is applied to the asset and a process of creating a usage-specific distributable version of the asset is initiated according to the usage-based specification, for the intended usage determined based on the usage signal. Optionally, during creation of the usage-specific distributable version of the asset, contextual asset creator communicates with calling program to obtain one or more supplementary assets such as captions, watermarks, or thumbnails, or to flag errors for the calling program to address, or to provide preview versions of assets to the calling program. For example, if the calling program does not supply a data value for an optional argument of the function call, such as the file name or link to a supplementary asset, contextual asset creator issues a prompt for the argument. As another example, if the asset size is larger than a threshold size for a particular asset type, contextual asset creator divides the asset into smaller segments (e.g., smaller ranges of pages or video frames). Preview versions may be generated and shown to the user asynchronously while the same asset is being converted to a usage-specific distributable form. For example, the contextual asset creator can break up a large document or video file into chunks and send preview versions of each chunk to the calling program while continuing to process subsequent chunks.

In some embodiments, error handling is incorporated into the flow so that the contextual asset creator can continue generation of the usage-specific distributable version of the asset after errors have been corrected. In other embodiments, errors are simply flagged for the calling program and the contextual asset creator process is discontinued, such that no distributable asset is provided to the calling program or to the application software program when an error has occurred.

If no errors have occurred or all errors have been handled, at time 416, the distributable version of the asset is provided to application software program. The line at time 416 is shown in dashed lines to indicate that in some instances, no asset is provided to application software program. At time 418, the application software program incorporates the distributable version of the asset received at time 416 into a content distribution at one or more user systems. The line at time 418 is shown in dashed lines to indicate that in some instances, the asset is not included in a distribution.

At time 406b, a second usage signal that indicates a different intended usage of a previously uploaded asset without re-uploading the asset is received by the contextual asset creator from the calling program. The second usage signal also references the same asset that was uploaded at time 402. However, at 406b, there is no need for another copy of the asset to be re-uploaded for the new usage indicated by the second usage signal. Instead, the contextual asset creator simply initiates the process of creating a new usage-specific distributable version of the previously uploaded asset for the new usage at time 408b by mapping the new usage to a usage-based specification and applying the new usage-based specification to the previously uploaded asset using the above-described approaches.

Figure 5A:
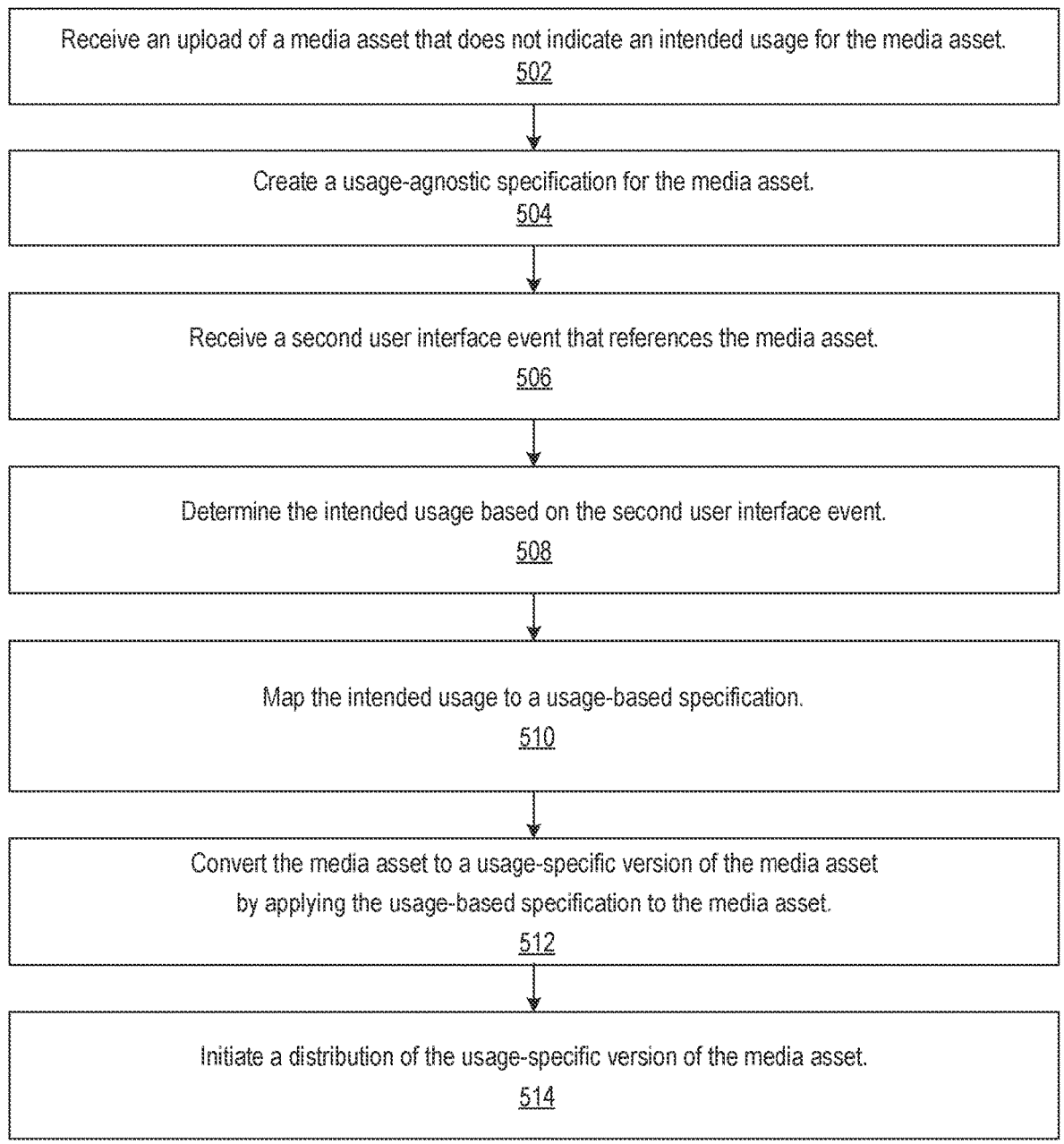
FIG. 5A is a flow diagram of an example method for creating distributable versions of media assets in accordance with some embodiments of the present disclosure.

FIG. 5A is a flow diagram of an example method for creating distributable versions of media assets in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the contextual asset creator 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, the processing device receives an upload of a media asset. The upload does not indicate an intended usage for the uploaded media asset. The processing device receives the upload from a first user device. The media asset includes one or more digital content items.

At operation 504, the processing device creates a usage-agnostic specification for the media asset. The usage-agnostic specification is created using a similar process as shown in FIG. 3C, described above, except that the process of operation 504 is not triggered by a usage signal and the artifacts defined by the usage-agnostic specification are not usage-specific but rather can be used by multiple different usages. The usage-agnostic specification is associated with an asset type of the uploaded media asset. The usage-agnostic specification is not associated with any particular usage of the uploaded media asset. The processing device determines the asset type of the uploaded media asset and based on the asset type, creates the usage-agnostic specification.

At operation 506, the processing device receives a second user interface event that references the media asset uploaded at operation 502. The processing device receives the second user interface event from the first user device. The second user interface event is not or does not require an upload of the media asset. Instead, the second user interface event indicates a usage context for the previously uploaded asset. Whereas the first user interface event uploaded a media asset at operation 502 without any usage contexts, the second user interface event supplies a usage context for the media asset without re-uploading the asset. In this way, the usage contexts do not need to be pre-defined at the time the media asset is uploaded. For example, a content distributor need not predict all of the possible usages of an asset at upload time. Rather, the content distributor uploads the asset once, and then each time the content distributor initiates a usage, the usage-based specification is triggered.

At operation 508, the processing device determines the intended usage based on the second user interface event. For example, the processing device applies a semantic interpretation technique to the second user interface event and predicts the intended usage using a mapping table, a rules engine, or a trained machine learning model.

In some embodiments, the intended usage determined at operation 508 includes a distribution mechanism and an asset type. Available distribution mechanisms can be determined based on the asset type. For example, if the asset type is video, the distribution mechanism could be one or more of a post, a message-based ad, a dynamic ad, or a carousel ad. Additional examples of determining the intended usage include determining that the asset type is image and, if the asset type is image, the distribution mechanism could be one or more of a post, a message-based ad, a dynamic ad, a carousel ad, or a single image ad. Further examples of determining the intended usage include determining that the asset type is document and, if the asset type is document, the distribution mechanism could be one or more of a post or a message-based ad.

At operation 510, the processing device maps the intended usage determined at operation 508 to a usage-based specification. In some embodiments, a mapping of intended usages to usage keys is maintained and a mapping of usage keys to usage-based specifications also is maintained. The mapping of intended usages to usage keys and the mapping of usage keys to usage-based specifications can be implemented as a single mapping using, for example, a database lookup. To map the intended usage to a usage-based specification, operation 510 includes determining an asset type of the media asset, mapping the intended usage and the asset type to a usage key using the mapping of intended usages to usage keys, and selecting the usage-based specification by applying the mapping of usage keys to usage-based specifications to the usage key. For example, after the processing device determines the intended usage based on the second user interface event, the processing device searches a database for a matching usage key and then uses the usage key to look up the corresponding usage-based specification. In some embodiments, once the usage-based specification is determined, the media asset is annotated with the selected usage-based specification.

At operation 512, the processing device converts the media asset to a usage-specific version of the media asset by applying the usage-based specification to the media asset. For example, operation 512 generates one or more artifacts according to pre-specified artifact classes. Operation 512 can include, for instance, creating artifacts that are needed by a particular hardware and/or software configuration of a distribution or user device. The artifacts generated at operation 512 can include, for instance, blurred, resized, or annotated versions of the original uploaded asset. In some embodiments, when the processing device determines that the media asset is a video, then, while converting the media asset to the usage-specific version of the media asset, the processing device sends a preview version of the media asset to the first user device but not to other user devices. The preview version of the media asset corresponds to a portion of the video, such as a segment of n seconds of the video, where n is a positive integer. After completion of the converting of the media asset to the usage-specific version of the media asset, the processing device replaces the preview version of the media asset with the usage-specific version of the media asset at the first user device.

In another embodiment, when the processing device determines that the media asset is a document, then while converting the media asset to a usage-specific version of the media asset, the processing device sends a set of preview versions of the media asset to the first user device but not to other user devices, where a preview version of the set of preview versions corresponds to a subset of n pages of the document, where n is a positive integer. After completion of the converting of the media asset to the usage-specific version of the media asset, the processing device replaces the set of preview versions of the media asset with the usage-specific version of the media asset at the first user device. In some embodiments, the usage-based specification specifies an optional artifact, such as a caption or a thumbnail image, and while converting the media asset to a usage-specific version of the media asset, the processing device adds the optional artifact to the media asset.

In still another example, when the processing device determines that the media asset includes a digital image, then applying the usage-based specification to the media asset includes at least one of: resizing the digital image, changing an aspect ratio of the digital image, adding a caption to the media asset, adding a thumbnail image to the media asset, converting the digital image from a first format to a second format different from the first format, or executing a validation process on the usage-specific version of the media asset.

In yet another example, when the processing device determines that that media asset includes a document, then applying the usage-based specification to the media asset includes at least one of: adding a watermark to the document, converting the document from a first format to a second format different from the first format, or executing a validation process on the usage-specific version of the media asset.

In another example, when the processing device determines that the media asset includes a video, then applying the usage-based specification to the media asset includes at least one of: changing a resolution of the video, changing a bit rate of the video, adding at least one caption to the media asset, adding at least one thumbnail image to the media asset, converting the video from a first format to a second format different from the first format, or executing a validation process on the usage-specific version of the media asset.

In some embodiments, converting the media asset to a usage-specific version of the media asset includes generating, as the at least one artifact, at least one of a media artifact that includes a representation of the media asset in a particular output format or a data artifact that includes data about the media asset.

At operation 514, the processing device initiates a distribution of the usage-specific version of the media asset. For example, the processing device sends the usage-specific version of the media asset to the application software system or to one or more user devices. A distribution distributes the usage-specific version of the media asset to one or more other user devices that are different from the first user device. The distribution is performed in accordance with the usage-based specification determined at operation 510.

Figure 5B:
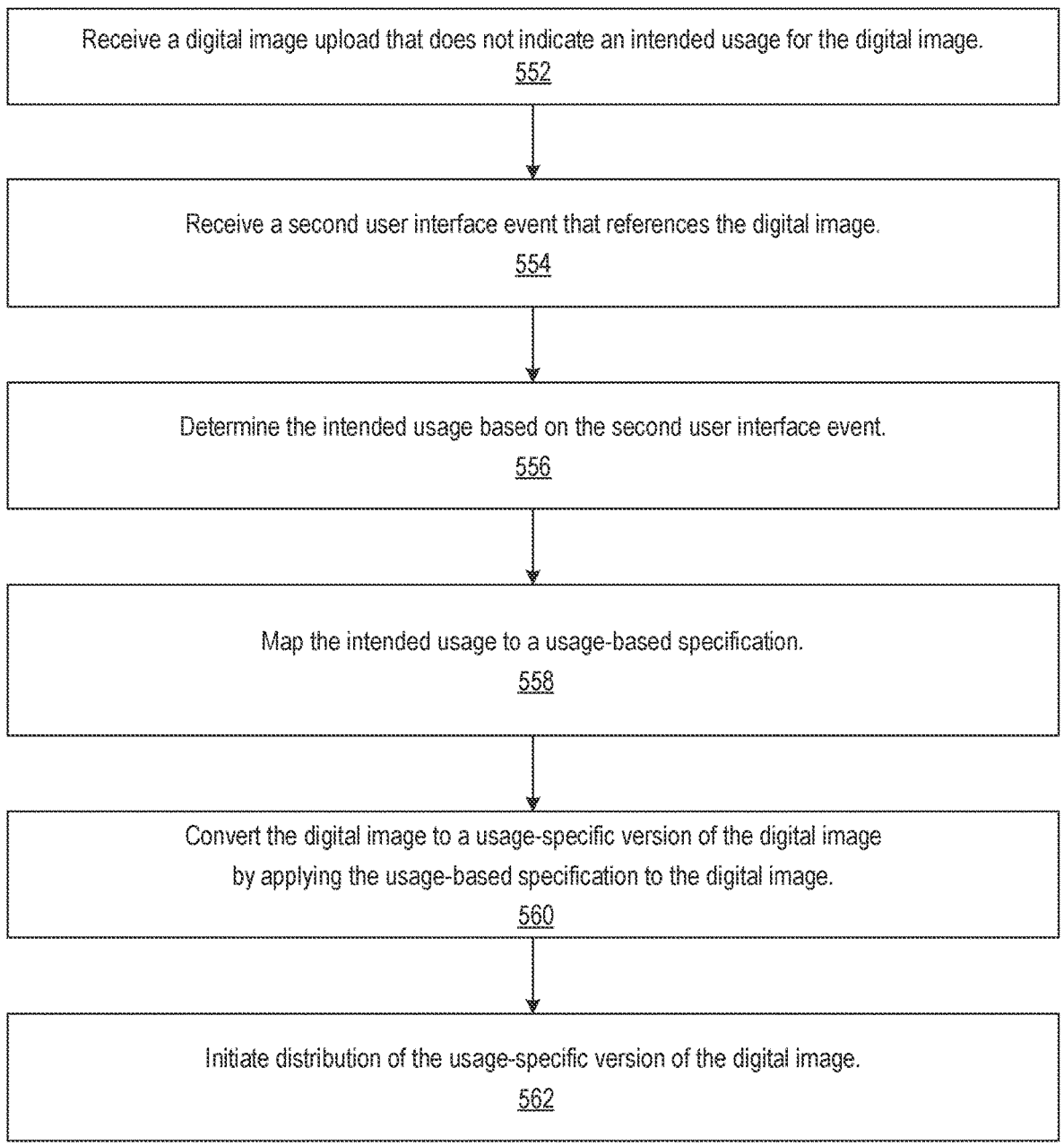
FIG. 5B is a flow diagram of another example method for creating distributable versions of media assets in accordance with some embodiments of the present disclosure.

FIG. 5B is a flow diagram of an example method for creating distributable versions of media assets in accordance with some embodiments of the present disclosure.

The method 550 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 550 is performed by the contextual asset creator 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 552, the processing device receives a digital image upload that does not indicate an intended usage for the digital image. The digital image upload can include one or more images, a sequence of images, or a sequence of images and audio, or a video. The processing device receives the image upload from a first user device.

At operation 554, the processing device receives a second user interface event that references the digital image. The processing device receives the second user interface event from the first user device. The second user interface event is not an upload of the digital image that was uploaded at operation 552.

At operation 556, the processing device determines an intended usage for the image uploaded at operation 552, based on the second user interface event. For example, the processing device applies a semantic interpretation process to the second user interface event and predicts the intended usage using a mapping table, a rules engine, or a trained machine learning model.

In some embodiments, the intended usage includes a distribution mechanism. The processing device determines, based on the second user interface event, that the distribution mechanism is, for example, a post, or a message-based ad, or a dynamic ad, or a carousel ad, or a single image ad.

At operation 558, the processing device maps the intended usage to a usage-based specification. In some embodiments, the processing device determines the usage-based specification based on the distribution mechanism determined at operation 556, and converts the digital image to the usage-specific version of the digital image based on the usage-based specification.

In some embodiments, the processing device maps the intended usage to a usage-based specification by maintaining a mapping of intended usages to usage keys, maintaining a mapping of usage keys to usage-based specifications, mapping the intended usage to a usage key using the mapping of intended usages to usage keys, and selecting the usage-based specification based on the mapping of usage keys to usage-based specifications. In some embodiments, the processing device annotates the digital image with the selected usage-based specification.

At operation 560, the processing device converts the digital image to a usage-specific version of the digital image by applying the usage-based specification to the digital image.

In some embodiments, converting the digital image to a usage-specific version of the digital image includes one or more of resizing the digital image, or changing an aspect ratio of the digital image, blurring the image, performing face recognition or object recognition on the image, up sampling or down sampling the image, applying color histogram processing to the image, performing video encoding or decoding, or adding a caption to the digital image, or adding a thumbnail image to the digital image, or converting the digital image from a first format to a second format different from the first format, or executing a validation process on the usage-specific version of the digital image. The usage-specific version of the digital image includes, for example, one or more artifacts.

At operation 562, the processing device initiates a distribution of the usage-specific version of the digital image created at operation 560. The distribution distributes the usage-specific version of the digital image to one or more other user devices that are different from the first user device. The distribution is performed in accordance with the usage-based specification.

FIG. 6 is a block diagram of an example computer system in which embodiments of the present disclosure can operate. FIG. 6 illustrates an example machine of a computer system 600 within which a set of instructions, for causing the machine to perform any one or more of the methodologies discussed herein, can be executed. In some embodiments, the computer system 600 can correspond to a component of a networked computer system (e.g., the computer system 100 of FIG. 1) that includes, is coupled to, or utilizes a machine to execute an operating system to perform operations corresponding to the application software system 130, including the contextual asset creator 140 of FIG. 1.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 612 for performing the operations and steps discussed herein.

Instructions 612 include portions the application software system 130 when those portions of the first party system are being executed by processing device 602. Thus, similar to the description above, contextual asset creator 140 is shown in dashed lines as part of instructions 612 to illustrate that, at times, portions of contextual asset creator 140 are executed by processing device 602. For example, when at least some portion of contextual asset creator 140 is embodied in instructions to cause processing device 602 to perform the method(s) described above, some of those instructions can be read into processing device 602 (e.g., into an internal cache or other memory) from main memory 604 and/or data storage system 640. However, it is not required that all of the contextual asset creators be included in instructions 612 at the same time and portions of the contextual asset creator are stored in one or more other components of computer system 600 at other times, e.g., when one or more portions of the contextual asset creator are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored one or more sets of instructions 644 or software embodying any one or more of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 644 include instructions to implement functionality corresponding to a contextual asset creator of a first party system (e.g., the contextual asset creator 140 of FIG. 1).

Dashed lines are used in FIG. 6 to indicate that it is not required that the contextual asset creator be embodied entirely in instructions 612, 614, and 644 at the same time. In one example, portions of the contextual asset creator are embodied in instructions 644, which are read into main memory 604 as instructions 614, and portions of instructions 614 are read into processing device 602 as instructions 612 for execution. In another example, some portions of the contextual asset creator are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the computer-implemented methods 300A, 300B, 300C, 100, 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the examples described below.

In an example 1, a method includes receiving, from a first user device, a first user interface event that comprises an upload of a media asset but does not indicate an intended usage for the media asset; creating a usage-agnostic specification for the media asset; receiving, from the first user device, a second user interface event that references the media asset; determining the intended usage based on the second user interface event; mapping the intended usage to a usage-based specification that comprises instructions for generating at least one artifact of the media asset based on the intended usage; converting the media asset to a usage-specific version of the media asset that includes the at least one artifact by applying the usage-based specification to the media asset; and initiating a distribution of the usage-specific version of the media asset instead of the media asset to at least one second user device different from the first user device.

An example 2 includes the subject matter of example 1, where mapping the intended usage to a usage-based specification includes: maintaining a mapping of intended usages to usage keys; maintaining a mapping of usage keys to usage-based specifications; determining an asset type of the media asset; mapping the intended usage and the asset type to a usage key using the mapping of intended usages to usage keys; and selecting the usage-based specification by applying the mapping of usage keys to usage-based specifications to the usage key. An example 3 includes the subject matter of example 2, further including: annotating the media asset with the selected usage-based specification. An example 4 includes the subject matter of any of examples 1-3, further including: determining that the media asset includes a video; converting the media asset to the usage-specific version of the media asset; sending a preview version of the media asset to the first user device but not the at least one second user device; where the preview version of the media asset corresponds to a portion of the video; and replacing the preview version of the media asset with the usage-specific version of the media asset at the first user device. An example 5 includes the subject matter of any of examples 1-4, further including: determining that the media asset is a document; sending a plurality of preview versions of the media asset to the first user device but not the at least one second user device; where a preview version of the plurality of preview versions corresponds to a subset of pages of the document; and replacing the plurality of preview versions of the media asset with the usage-specific version of the media asset at the first user device. An example 6 includes the subject matter of any of examples 1-5, further including: adding an optional artifact to the media asset; where the usage-based specification specifies an optional artifact. An example 7 includes the subject matter of any of examples 1-6, further including: determining that the media asset includes a digital image; and applying the usage-based specification to the media asset includes at least one of: resizing the digital image; changing an aspect ratio of the digital image; adding a caption to the media asset; adding a thumbnail image to the media asset; converting the digital image from a first format to a second format different from the first format; applying face recognition or object recognition to the digital image; or executing a validation process on the usage-specific version of the media asset. An example 8 includes the subject matter of any of examples 1-7, further including: determining that that media asset includes a document; and applying the usage-based specification to the media asset includes at least one of: adding a watermark to the document; converting the document from a first format to a second format different from the first format; or executing a validation process on the usage-specific version of the media asset. An example 9 includes the subject matter of any of examples 1-8, further including: determining that the media asset includes a video; and applying the usage-based specification to the media asset includes at least one of: changing a resolution of the video; changing a bit rate of the video; adding at least one caption to the media asset; adding at least one thumbnail image to the media asset; converting the video from a first format to a second format different from the first format; or executing a validation process on the usage-specific version of the media asset. An example 10 includes the subject matter of any of examples 1-9, where the intended usage includes a distribution mechanism and an asset type, and determining the intended usage includes: determining that the asset type includes video and the distribution mechanism includes a post; determining that the asset type includes video and the distribution mechanism includes a message-based ad; determining that the asset type includes video and the distribution mechanism includes a dynamic ad; or determining that the asset type includes video and the distribution mechanism includes a carousel ad. An example 11 includes the subject matter of any of examples 1-10, where the intended usage includes a distribution mechanism and an asset type, and determining the intended usage includes: determining that the asset type includes image and the distribution mechanism includes a post; determining that the asset type includes image and the distribution mechanism includes a message-based ad; determining that the asset type includes image and the distribution mechanism includes a dynamic ad; determining that the asset type includes image and the distribution mechanism includes a carousel ad; or determining that the asset type includes image and the distribution mechanism includes a single image ad. An example 12 includes the subject matter of any of examples 1-11, where the intended usage includes a distribution mechanism and an asset type, and determining the intended usage includes: determining that the asset type includes document and the distribution mechanism includes a post; or determining that the asset type includes document and the distribution mechanism includes a message-based ad. An example 13 includes the subject matter of any of examples 1-12, where converting the media asset to a usage-specific version of the media asset includes: generating, as the at least one artifact, at least one of a media artifact that includes a representation of the media asset in a particular output format or a data artifact that includes data about the media asset.

In an example 14, a system includes at least one processor; and at least one memory coupled to the at least one processor, where the at least one memory includes instructions that, when executed by the at least one processor, cause the at least one processor to be capable of performing operations including: receiving, from a first user device, a first user interface event that includes an upload of a digital image but does not indicate an intended usage for the digital image; receiving, from the first user device, a second user interface event that references the digital image; determining the intended usage based on the second user interface event; mapping the intended usage to a usage-based specification that includes instructions for generating at least one artifact of the digital image based on the intended usage; converting the digital image to a usage-specific version of the digital image that includes the at least one artifact by applying the usage-based specification to the digital image; and initiating a distribution of the usage-specific version of the digital image instead of the digital image to at least one second user device different from the first user device.

An example 15 includes the subject matter of example 14, where the instructions, when executed by the at least one processor, cause the at least one processor to be capable of performing operations including mapping the intended usage to a usage-based specification by: maintaining a mapping of intended usages to usage keys; maintaining a mapping of usage keys to usage-based specifications; mapping the intended usage to a usage key using the mapping of intended usages to usage keys; and selecting the usage-based specification based on the mapping of usage keys to usage-based specifications. An example 16 includes the subject matter of example 14 or example 15, where the instructions, when executed by the at least one processor, cause the at least one processor to be capable of performing operations further including: annotating the digital image with the selected usage-based specification. An example 17 includes the subject matter of any of examples 14-16, where the instructions, when executed by the at least one processor, cause the at least one processor to be capable of performing operations including at least one of: resizing the digital image; or changing an aspect ratio of the digital image. An example 18 includes the subject matter of any of examples 14-17, where the instructions, when executed by the at least one processor, cause the at least one processor to be capable of performing operations including at least one of: adding a caption to the digital image; or adding a thumbnail image to the digital image. An example 19 includes the subject matter of any of examples 14-18, where the instructions, when executed by the at least one processor, cause the at least one processor to be capable of performing operations including at least one of: converting the digital image from a first format to a second format different from the first format; applying face recognition or object recognition to the digital image; or executing a validation process on the usage-specific version of the digital image. An example 20 includes the subject matter of any of examples 14-19, where the intended usage includes a distribution mechanism and the instructions, when executed by the at least one processor, cause the at least one processor to be capable of performing operations including: determining, based on the second user interface event, that the distribution mechanism includes a post; determining, based on the second user interface event, that the distribution mechanism includes a message-based ad; determining, based on the second user interface event, that the distribution mechanism includes a dynamic ad; determining, based on the second user interface event, that the distribution mechanism includes a carousel ad; or determining, based on the second user interface event, that the distribution mechanism includes a single image ad; determining the usage-based specification based on the determined distribution mechanism; and converting the digital image to the usage-specific version of the digital image based on the determined usage-based specification.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

The invention claimed is:

1. A method comprising:
receiving, from a first user device, a first user interface event that comprises an upload of a media asset but does not indicate an intended usage for the media asset;
storing the uploaded media asset;
creating a usage-agnostic specification for the media asset;
receiving, from the first user device, a second user interface event that references the media asset;
determining the intended usage based on the second user interface event;
mapping the intended usage to a usage-based specification that comprises a set of instructions for generating at least one artifact of the media asset based on the intended usage, wherein the set of instructions comprises at least one instruction for generating a representation of media content of the media asset in a particular output format needed by at least one of a particular hardware configuration or a particular software configuration of at least one of a distribution or a user device;
converting the media asset to a usage-specific version of the media asset that includes the at least one artifact by applying the usage-based specification to the media asset, wherein the at least one artifact comprises the representation of the media content of the media asset in the particular output format needed by the at least one of the particular hardware configuration or the particular software configuration of the at least one of the distribution or the user device;
initiating the distribution of the usage-specific version of the media asset including the at least one artifact to at least one second user device different from the first user device; and
for each intended usage of a plurality of intended usages, annotating the stored media asset with the usage-based specification that maps to the respective intended usage.

2. The method of claim 1, wherein mapping the intended usage to a usage-based specification comprises:
maintaining a mapping of intended usages to usage keys;
maintaining a mapping of usage keys to usage-based specifications;
determining an asset type of the media asset;
mapping the intended usage and the asset type to a usage key using the mapping of intended usages to usage keys; and
selecting the usage-based specification by applying the mapping of usage keys to usage-based specifications to the usage key.

3. The method of claim 2, further comprising:
annotating the media asset with the selected usage-based specification.

4. The method of claim 1, further comprising:
determining that the media asset comprises a video;
converting the media asset to the usage-specific version of the media asset;
sending a preview version of the media asset to the first user device but not the at least one second user device;
wherein the preview version of the media asset corresponds to a portion of the video; and
replacing the preview version of the media asset with the usage-specific version of the media asset at the first user device.

5. The method of claim 1, further comprising:
determining that the media asset is a document;
sending a plurality of preview versions of the media asset to the first user device but not the at least one second user device;
wherein a preview version of the plurality of preview versions corresponds to a subset of pages of the document; and
replacing the plurality of preview versions of the media asset with the usage-specific version of the media asset at the first user device.

6. The method of claim 1, further comprising:
adding an optional artifact to the media asset;
wherein the usage-based specification specifies an optional artifact.

7. The method of claim 1, further comprising:
determining that the media asset comprises a digital image; and
applying the usage-based specification to the media asset comprises at least one of:
resizing the digital image;
changing an aspect ratio of the digital image;
adding a caption to the media asset;
adding a thumbnail image to the media asset;
converting the digital image from a first format to a second format different from the first format;
applying face recognition or object recognition to the digital image; or
executing a validation process on the usage-specific version of the media asset.

8. The method of claim 1, further comprising:
determining that that media asset comprises a document; and
applying the usage-based specification to the media asset comprises at least one of:
adding a watermark to the document;
converting the document from a first format to a second format different from the first format; or
executing a validation process on the usage-specific version of the media asset.

9. The method of claim 1, further comprising:
determining that the media asset comprises a video; and
applying the usage-based specification to the media asset comprises at least one of:
changing a resolution of the video;
changing a bit rate of the video;
adding at least one caption to the media asset;
adding at least one thumbnail image to the media asset;
converting the video from a first format to a second format different from the first format; or
executing a validation process on the usage-specific version of the media asset.

10. The method of claim 1, wherein the intended usage comprises a distribution mechanism and an asset type, and determining the intended usage comprises:
determining that the asset type comprises video and the distribution mechanism comprises a post;

determining that the asset type comprises video and the distribution mechanism comprises a message-based ad;
determining that the asset type comprises video and the distribution mechanism comprises a dynamic ad; or
determining that the asset type comprises video and the distribution mechanism comprises a carousel ad.

11. The method of claim 1, wherein the intended usage comprises a distribution mechanism and an asset type, and determining the intended usage comprises:
determining that the asset type comprises image and the distribution mechanism comprises a post;
determining that the asset type comprises image and the distribution mechanism comprises a message-based ad;
determining that the asset type comprises image and the distribution mechanism comprises a dynamic ad;
determining that the asset type comprises image and the distribution mechanism comprises a carousel ad; or
determining that the asset type comprises image and the distribution mechanism comprises a single image ad.

12. The method of claim 1, wherein the intended usage comprises a distribution mechanism and an asset type, and determining the intended usage comprises:
determining that the asset type comprises document and the distribution mechanism comprises a post; or
determining that the asset type comprises document and the distribution mechanism comprises a message-based ad.

13. The method of claim 1, wherein converting the media asset to a usage-specific version of the media asset comprises:
generating, as the at least one artifact, a data artifact that comprises data about the media asset.

14. A system comprising:
at least one processor; and
at least one memory coupled to the at least one processor;
the at least one memory comprises instructions that, when executed by the at least one processor, cause the at least one processor to be capable of performing operations comprising:
receiving, from a first user device, a first user interface event that comprises an upload of a digital image but does not indicate an intended usage for the digital image;
receiving, from the first user device, a second user interface event that references the digital image;
determining the intended usage based on the second user interface event;
mapping the intended usage to a usage-based specification that comprises instructions for generating at least one artifact of the digital image based on the intended usage, wherein the set of instructions comprises at least one instruction for generating a representation of the digital image in a particular output format needed by at least one of a particular hardware configuration or a particular software configuration of at least one of a distribution or a user device;
converting the digital image to a usage-specific version of the digital image that includes the at least one artifact by applying the usage-based specification to the digital image, wherein the at least one artifact comprises the representation of the digital image in the particular output format needed by the at least one of the particular hardware configuration or the particular software configuration of the at least one of the distribution or the user device; and
initiating a distribution of the usage-specific version of the digital image including the at least one artifact to at least one second user device different from the first user device.

15. The system of claim 14, wherein the instructions, when executed by the at least one processor, cause the at least one processor to be capable of performing operations comprising mapping the intended usage to a usage-based specification by:
maintaining a mapping of intended usages to usage keys;
maintaining a mapping of usage keys to usage-based specifications;
mapping the intended usage to a usage key using the mapping of intended usages to usage keys; and
selecting the usage-based specification based on the mapping of usage keys to usage-based specifications.

16. The system of claim 15, wherein the instructions, when executed by the at least one processor, cause the at least one processor to be capable of performing operations further comprising:
annotating the digital image with the selected usage-based specification.

17. The system of claim 14, wherein the instructions, when executed by the at least one processor, cause the at least one processor to be capable of performing operations comprising at least one of:
resizing the digital image; or
changing an aspect ratio of the digital image.

18. The system of claim 14, wherein the instructions, when executed by the at least one processor, cause the at least one processor to be capable of performing operations comprising at least one of:
adding a caption to the digital image; or
adding a thumbnail image to the digital image.

19. The system of claim 14, wherein the instructions, when executed by the at least one processor, cause the at least one processor to be capable of performing operations comprising at least one of:
converting the digital image from a first format to a second format different from the first format;
applying face recognition or object recognition to the digital image; or
executing a validation process on the usage-specific version of the digital image.

20. The system of claim 14, wherein the intended usage comprises a distribution mechanism and the instructions, when executed by the at least one processor, cause the at least one processor to be capable of performing operations comprising:
determining, based on the second user interface event, that the distribution mechanism comprises a post;
determining, based on the second user interface event, that the distribution mechanism comprises a message-based ad;
determining, based on the second user interface event, that the distribution mechanism comprises a dynamic ad;
determining, based on the second user interface event, that the distribution mechanism comprises a carousel ad; or
determining, based on the second user interface event, that the distribution mechanism comprises a single image ad;
determining the usage-based specification based on the determined distribution mechanism; and converting the digital image to the usage-specific version of the digital image based on the determined usage-based specification.

\* \* \* \* \*